United States Patent [19]

Alexander et al.

[11] 4,155,327

[45] May 22, 1979

[54] APPARATUS FOR APPLYING LOCKING COMPOUND TO THREADED FASTENERS

[75] Inventors: Scott R. Alexander, San Marino; Darrel L. Burke, Balboa, both of Calif.

[73] Assignee: Torkon Fastener Corporation, Anaheim, Calif.

[21] Appl. No.: 769,681

[22] Filed: Feb. 17, 1977

[51] Int. Cl.² .............................................. B05C 5/02
[52] U.S. Cl. ..................................... 118/620; 118/66; 118/319; 118/500; 335/285; 427/287; 427/424
[58] Field of Search ............... 118/620, 642, 643, 319, 118/69, 230, 500, 317, 622; 427/287, 318, 424; 335/285

[56] References Cited

U.S. PATENT DOCUMENTS

| | | | |
|---|---|---|---|
| 2,088,542 | 7/1937 | Westin | 118/319 X |
| 2,329,024 | 9/1943 | Albright | 118/319 X |
| 2,723,206 | 11/1955 | Falk | 427/424 |
| 2,816,790 | 12/1957 | Johnson | 335/285 X |
| 3,058,840 | 10/1962 | Kerr et al. | 118/620 X |
| 3,344,769 | 10/1967 | Williams | 118/69 |
| 3,416,492 | 12/1968 | Greenleaf | 118/620 |
| 3,452,714 | 7/1969 | Burke et al. | 118/620 |
| 3,530,827 | 9/1970 | Burke | 118/620 |
| 3,557,750 | 1/1971 | Gallagher | 118/319 X |
| 3,571,833 | 3/1971 | Cadwallader et al. | 10/72 R |
| 3,795,224 | 3/1974 | Batson et al. | 118/308 |
| 3,831,736 | 8/1974 | Barnes | 198/690 |
| 3,894,509 | 7/1975 | Duffy et al. | 118/50.1 X |
| 3,991,704 | 11/1976 | Hulstein et al. | 118/2 |
| 4,046,106 | 9/1977 | Bowman | 118/69 X |
| 4,082,058 | 4/1978 | Dieme | 118/319 |

*Primary Examiner*—Mervin Stein
*Attorney, Agent, or Firm*—Paul A. Weilein

[57] ABSTRACT

An apparatus for high speed application of locking compound to threaded fasteners. A chute guides a continuous flow of fasteners from a feeder bowl to a transporting wheel supported for rotation about a vertical axis. The wheel is provided with a magnet around its periphery which magnetically engages the heads of the fasteners to hold their threaded shanks extending horizontally outwardly from the periphery of the wheel. The fasteners are heated by induction heating and a liquid compound is applied under pressure to a controlled portion of the threads through a continuously vibrated nozzle. Heated air is then applied to drive off solvent from the compound. An air blower then applies ambient temperature air, followed by injecting a cooling air mist containing soluble oil which prevents the fasteners from adhering to each other prior to the hardening of the compound. A pick-off wheel magnetically driven by the transporting wheel separates the fasteners from the transporting wheel.

13 Claims, 11 Drawing Figures

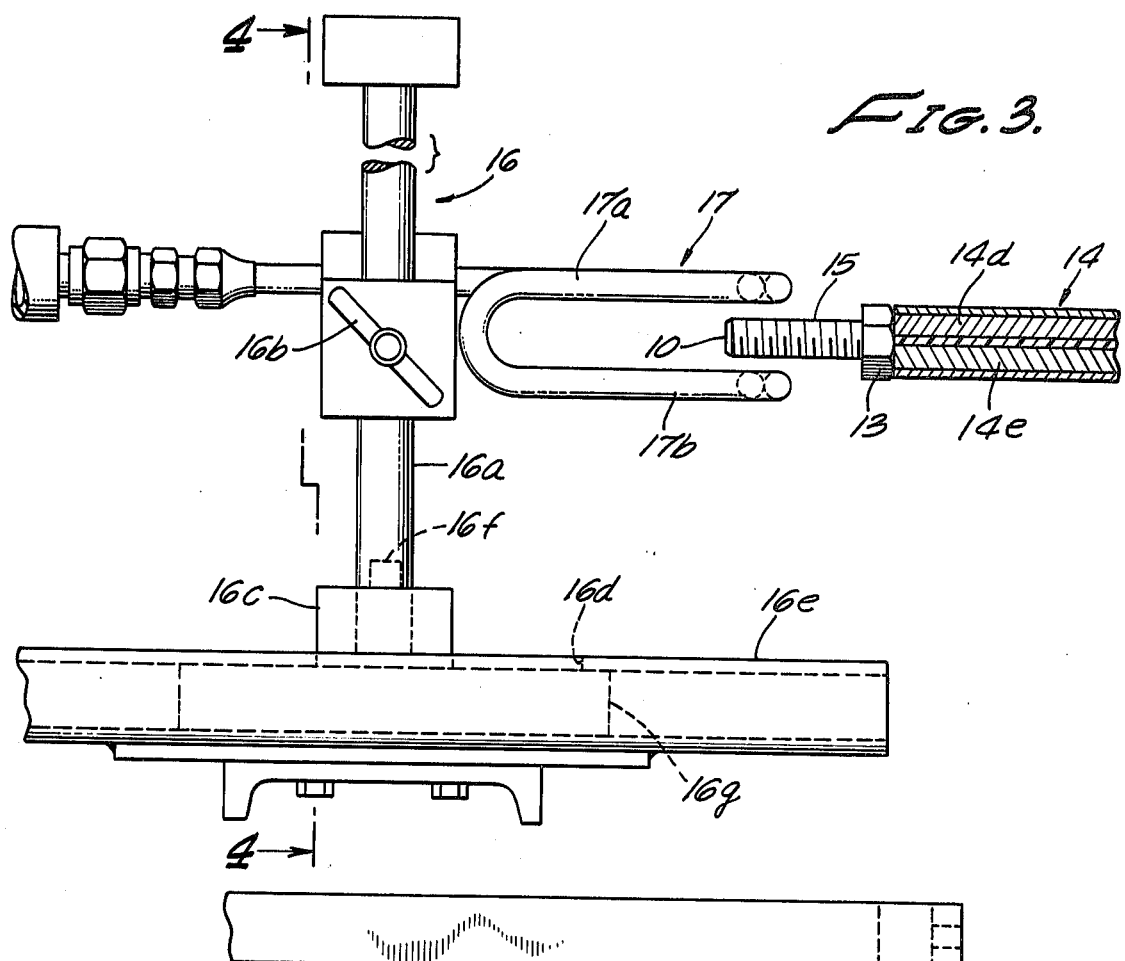
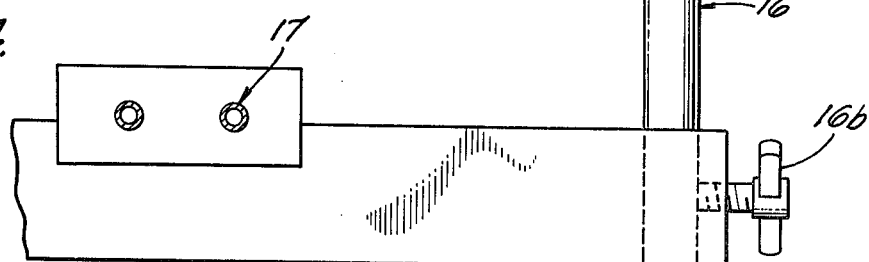
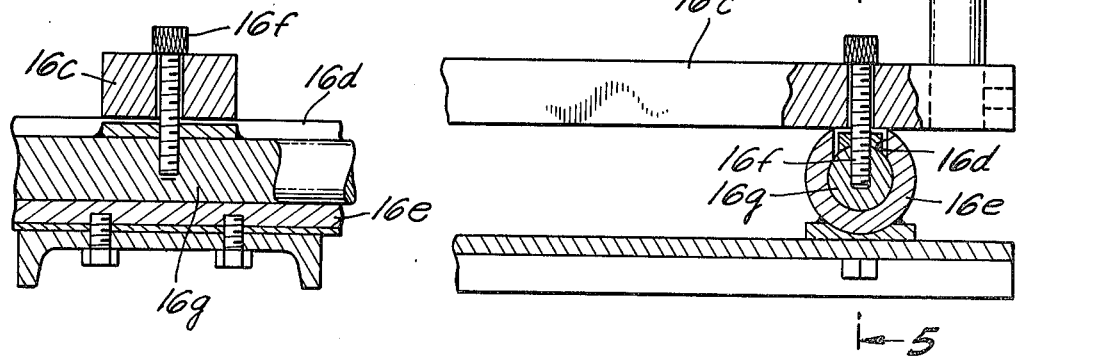

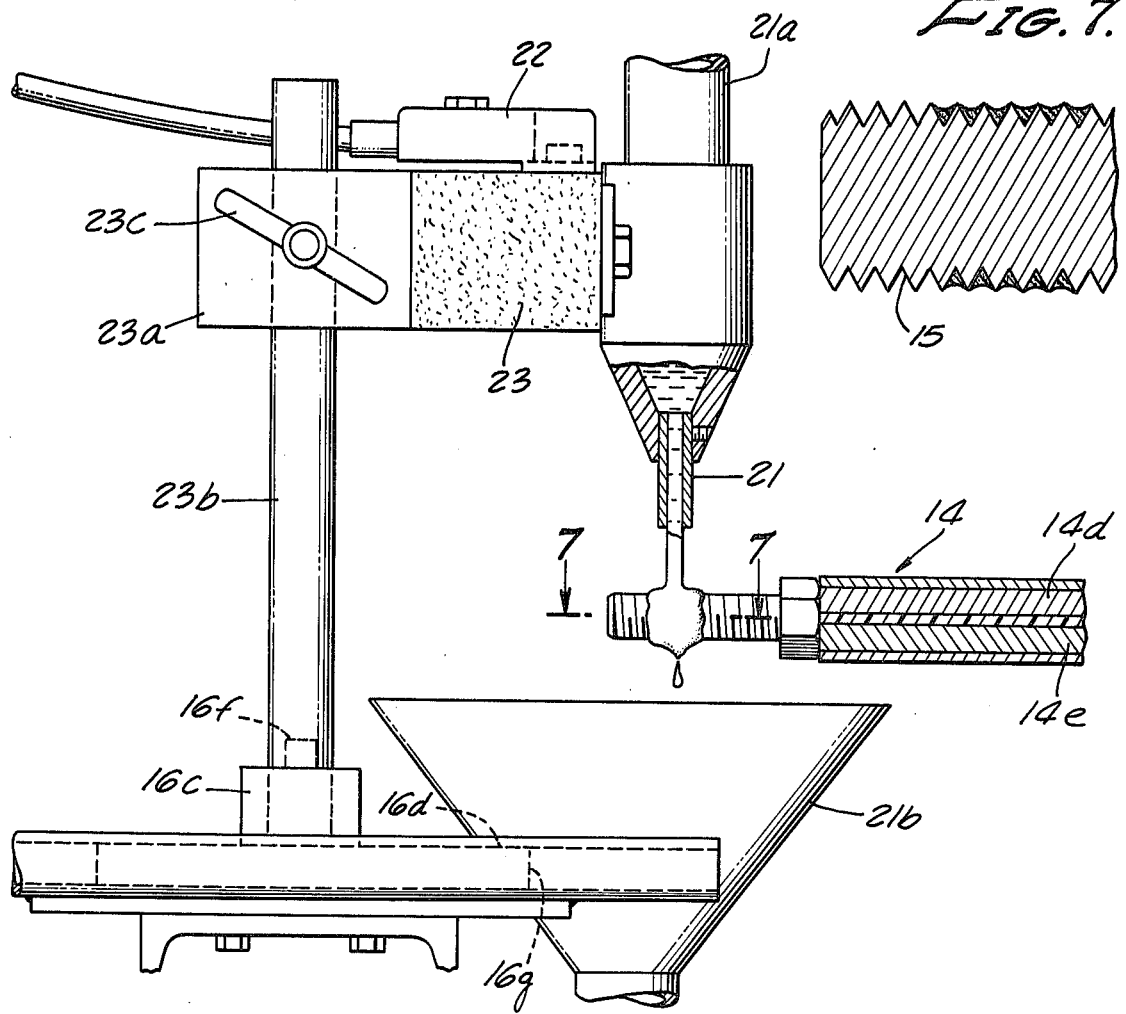
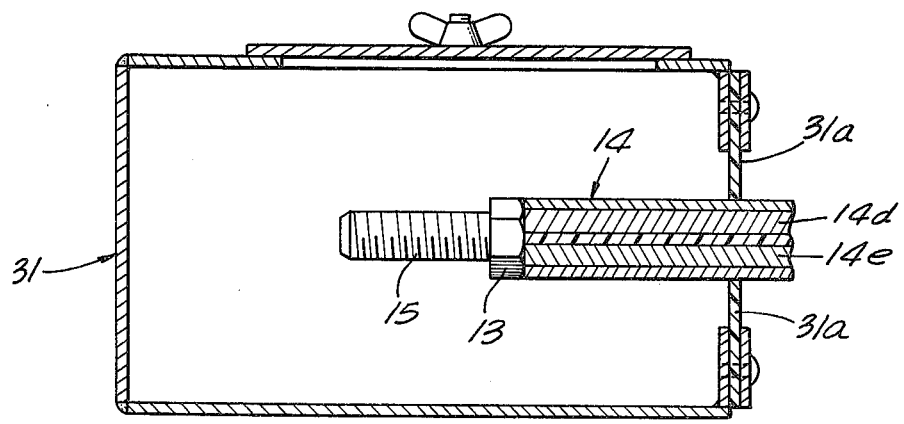

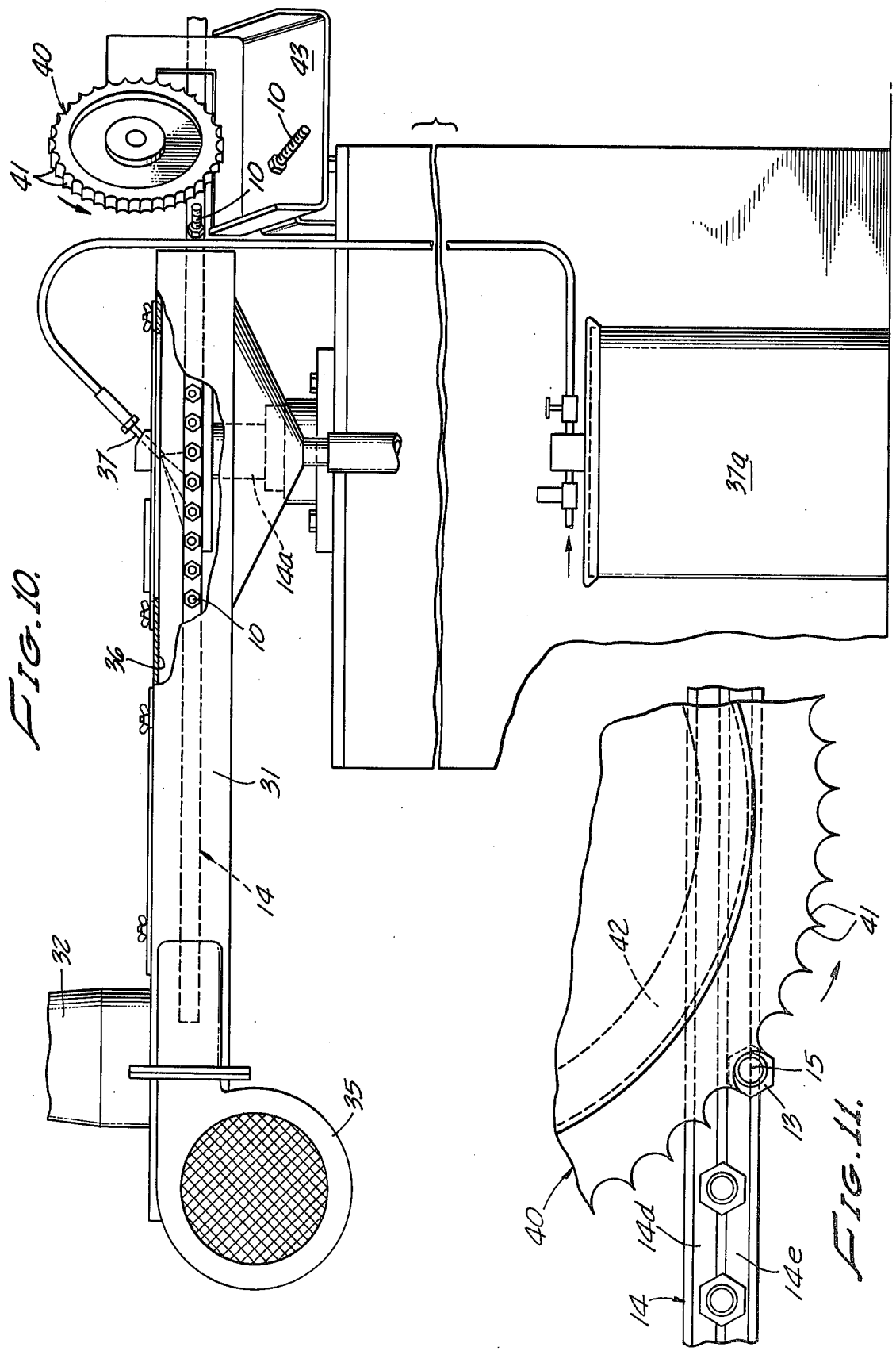

APPARATUS FOR APPLYING LOCKING COMPOUND TO THREADED FASTENERS

BACKGROUND OF THE INVENTION

1. Field of the Invention

The invention relates to an apparatus for automatic high speed application of a liquid locking compound to a threaded portion of a fastener to provide fasteners which are self-locking when placed in use.

2. Description of the Prior Art

Self-locking fasteners and compounds for use on such fasteners are known in the art, as are various methods of applying locking compounds to the fasteners.

U.S. Pat. No. 3,530,827 shows a machine for applying a locking patch to a threaded element in which the fasteners are mounted on a plurality of fixed spaced pins disposed around the periphery of a wheel supported for rotation on a horizontal axis. The orientation of the threaded portions changes continuously as the wheel rotates. The fasteners are heated and compound is then applied from a gravity feed reservoir. The fasteners are separated from the wheel by an air jet.

U.S. Pat. Nos. 3,571,833 and 3,894,509 show rotating wheels having fixed spaced openings for holding nuts having internal threading to which compound is applied.

Other prior patents disclose various other structures and methods which are constructed or function differently from the present invention.

SUMMARY OF THE INVENTION

The present invention relates to an apparatus for automatic high speed application of locking compounds to controlled limited portions of the threaded area of fasteners. A feeder bowl is supplied with a quantity of fasteners, which are then conducted by a chute and oriented automatically into positions wherein their heads are directed toward the periphery of a transporting wheel 50 a vertical axis of rotation. The wheel is provided with magnetic means around its entire periphery so that the fasteners are held by magnetic engagement of their heads against the periphery of the wheel.

It should be noted that the wheel has no rigidly fixed or spaced pins, pockets or similar fastening grip means with which fasteners must be aligned and/or engaged. This provides a distinct advantage in that the supply of fasteners to the wheel need not be controlled or evenly spaced.

The threaded shanks of the fasteners are securely held in a horizontally directed position, which has the advantage of permitting application of the locking compound to only a limited and controlled portion of the threads. Such orientation prevents the locking compound from flowing onto other portions of the fasteners due to moving the threaded portion out of a horizontal position.

After the fasteners have been heated, the liquid locking compound is applied to the desired thread portion by a nozzle. The compound is applied under pressure from a suitable pressurized source which may comprise a power driven pump having a variable speed control through which the rate of flow through the nozzle can be controlled to an appropriate stream size, thereby eliminating the conventional gravity feed reservoir. A mechanical vibrator acts to vibrate the nozzle assembly to prevent nozzle clogging. With this structure and method, the number of hoses as usually required is materially reduced.

After the compound has been applied, the fasteners are subjected to a two-step cooling action. First, ambient air flow under pressure is applied and then an air mist containing a water soluble oil is applied to further cool the fasteners and prevent them from adhering to each other before the adhesive compound has hardened.

A pick-off wheel for removing the treated fasteners from the transport wheel is rotated by a steel ring having engagement with the magnetic means on the transporting wheel. The pick-off wheel has peripheral teeth which engage the finished fasteners and separate them from their magnetic engagement with the transporting wheel.

It is among the objects of the invention to provide an apparatus and method for applying locking compound to threaded fasteners which has all of the advantages and benefits of the apparatus and method set forth above and described in further detail hereinafter in this specification.

It is one object of the invention to provide an apparatus and method of the type described which is capable of automatic high speed production, and which has the capability of handling different types of locking compounds and a wide range of fastener sizes.

A further object is to provide such an apparatus and method in which precisely the proper amount of a fluent locking compound will be evenly applied to self-locking fasteners in order to give consistent installation, locking and breakaway torque characteristics.

A further object of the invention is to provide a unique fastener transporting means which comprises a rotating horizontal wheel having means for supporting fastener members such as bolts in a horizontal position, during the application of locking compound, to control the application to a specific area.

Another more particular object of the invention is to provide means for mechanically vibrating the compound applicator nozzle in order to assure continuous flow and prevent clogging.

A further object of the invention is to provide a rotatable pick-off wheel for engaging and separating the fasteners from a transporting wheel, when their treatment has been completed.

The invention also comprises such objects, advantages and capabilities as will later more full appear and which are inherently possessed by the invention.

BRIEF DESCRIPTION OF THE DRAWINGS

Referring to the drawings, which are for illustrative purposes only:

FIG. 3 is an enlarged partial sectional view taken substantially on line 3—3 of FIG. 1, showing the operative relationship of the induction heater with respect to the end of a fastener device during treatment;

FIG. 4 is a fragmentary elevational view partly in section taken substantially on line 4—4 of FIG. 3;

FIG. 5 is a vertical sectional view taken substantially on line 5—5 of FIG. 4;

FIG. 6 is an enlarged fragmentary elevational view partly in section taken substantially on line 6—6 of FIG. 1, showing the operative relationship of the nozzle for applying a locking compound to a fastener;

FIG. 7 is a further enlarged sectional view of the fastener taken substantially on line 7—7 of FIG. 6;

FIG. 9 is an enlarged transverse sectional view taken substantially on line 9—9 of FIG. 1, showing a portion of the transporting wheel and a fastener within the heating chamber;

FIG. 10 is an enlarged elevational view as seen from line 10—10 of FIG. 1, showing the two-stage cooling assembly and the pick-off wheel; and FIG. 11 is an enlarged fragmentary view illustrating the operation of the pick-off wheel in removing a magnetically supported fastener from the transport wheel.

DESCRIPTION OF THE PREFERRED EMBODIMENT

Figure 2:
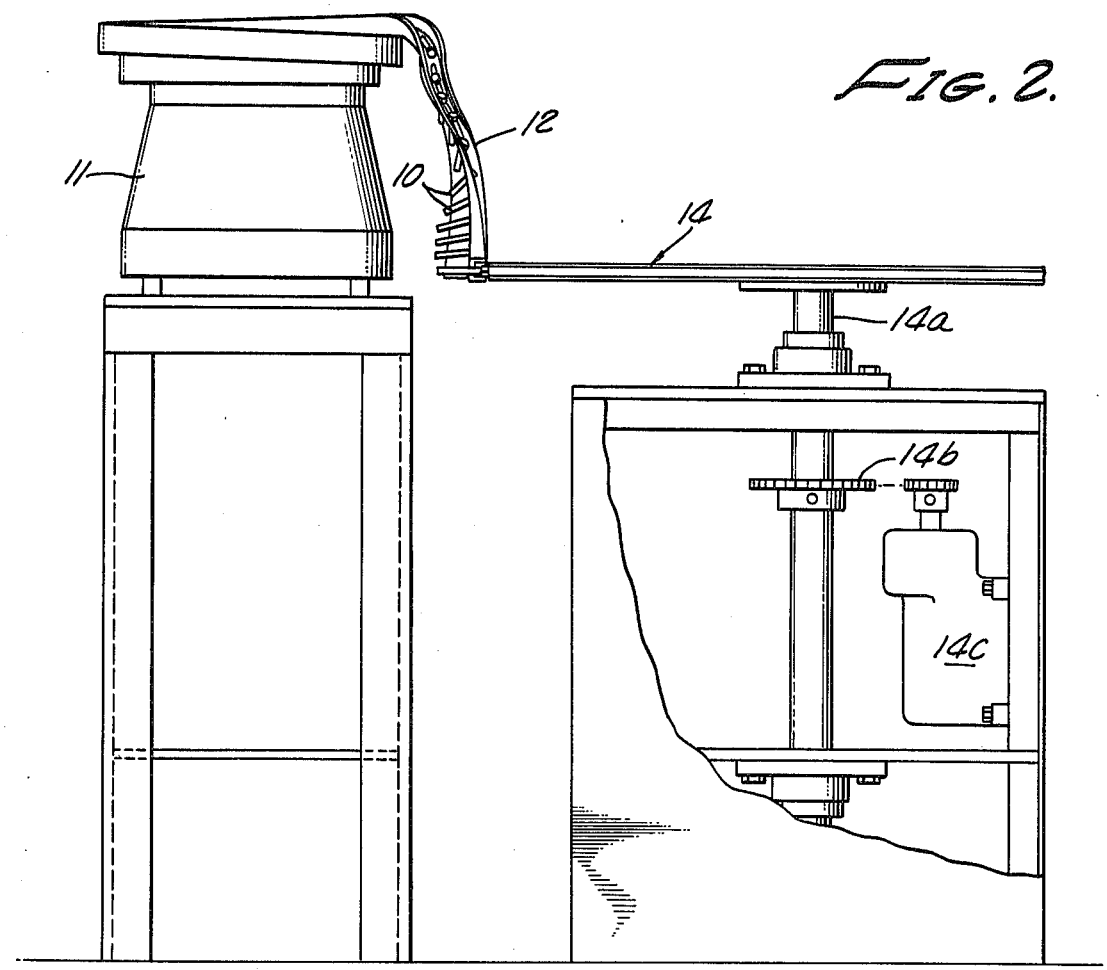
FIG. 2 is an enlarged partial sectional view taken substantially on line 2—2 of FIG. 1, showing details of the feeder bowl, transporting wheel and wheel drive assembly.

The drawings show a presently preferred embodiment of the invention. A plurality of threaded fasteners 10, such as threaded bolts, are placed within a vibratory feeder bowl 11 of a commercially available type. The fasteners 10 are separated and moved individually from the bowl 11 through sliding movement down a discharge chute 12. The chute 12 is twisted so as to guide the fasteners 10 down to pick-up positions in which the fasteners 10 have their heads 13 oriented adjacent the periphery of a large transporting wheel 14, which is supported for rotation about a vertical axis. As shown in FIG. 2, the transporting wheel 14 is mounted at the upper end of an rotatable shaft 14a which may be coupled through an appropriate driving connection 14b with a power source, such as a motor 14c.

Figure 1:
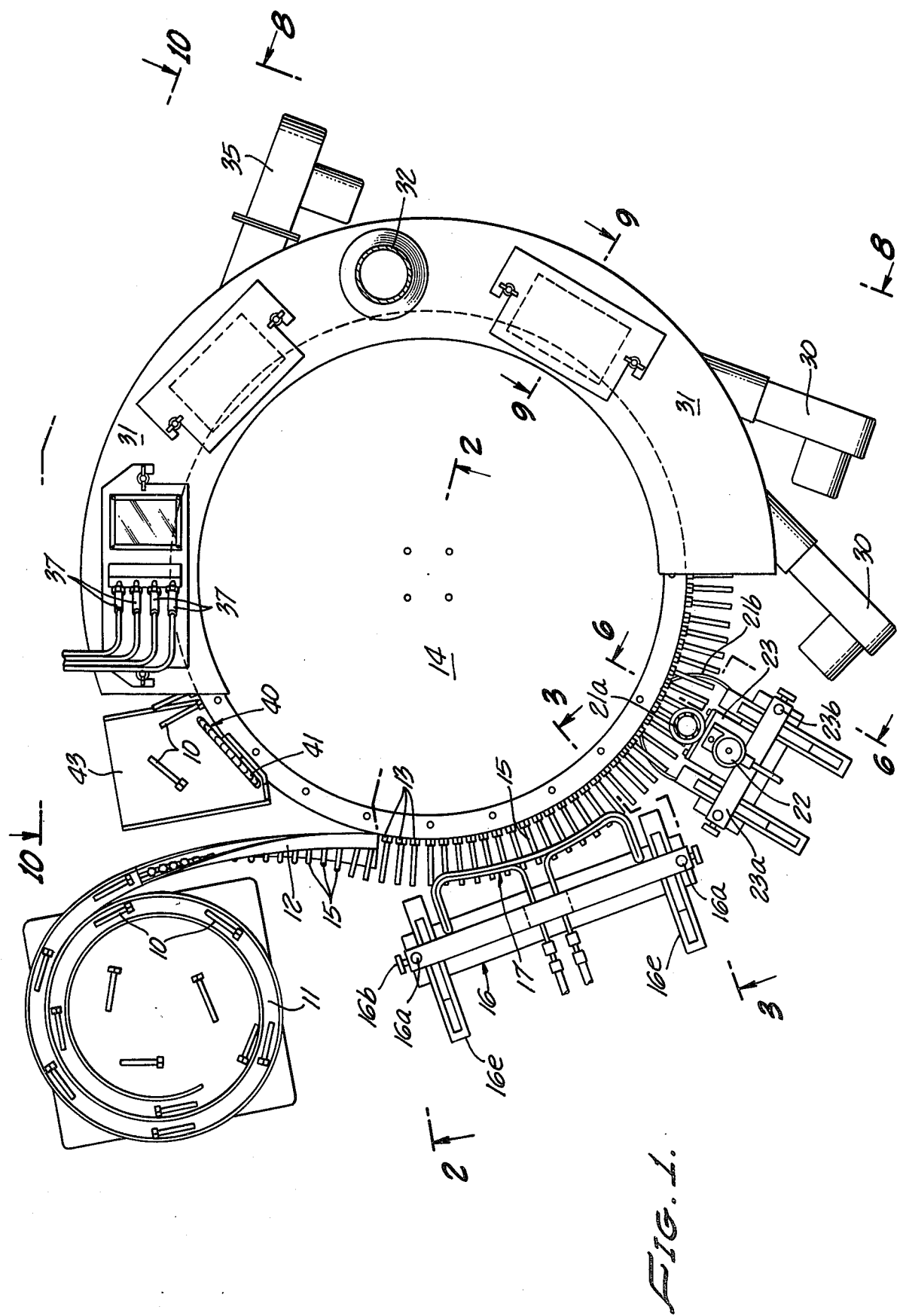
FIG. 1 is a top plan view of the entire apparatus showing the successive operative positions for applying a locking compound to fastening devices and treating the same according to the present invention.

The fasteners 10 are magnetically pulled out of the chute 12 by magnetized layers 14d and 14e, as shown in FIG. 3, which extend around the entire periphery of the wheel 14. The fasteners 10 are thereafter held with their heads 13 in magnetic engagement with the wheel 14 and their threaded shanks 15 extending horizontally outwardly from the periphery of the wheel 14. (FIGS. 1, 3 and 4.)

It should be noted that in the arrangement just described the fasteners 10 need not be aligned with or inserted into or be complementarily formed to fit any type of holding means. The apparatus and method are accordingly adapted to accommodate various types and shapes of fasteners without adjustment or alteration. The rate of flow of the fasteners may also vary without affecting the operation of the machine.

As the wheel 14 rotates, it successively carries the fasteners 10 past an induction heating unit 16 which heats at least the portions of the shanks 15 to which the locking compound is to be applied. Coils 17 of the induction heating unit 16 are preferably oriented so as to cover only the outer portions of the shanks 15, and are provided with vertically spaced portions 17a, 17b which are adapted to straddle the path of movement of the fasteners 10 and thus extend above and below the shanks 15, as best shown in FIG. 3.

If toluene thinned or carried chemicals are used, the shanks 15 are preferably heated to a temperature of approximately 260° F. However, it is contemplated that the temperatures used may be varied as necessary or desirable, and also that the heating step may be performed after the compound is applied, if such procedure is indicated.

Referring to FIGS. 3 and 4 of the drawings, the coils 17 of the heating unit 16 are shown as being mounted for vertical sliding movements with respect to an upstanding post 16a, in order to adjust the vertical position of the coils 17 as indicated by the particular size and shape of the fastener 10 being heated. A manually operable clamping member 16b engages the post 16a to hold the coils 17 in their adjusted position.

As shown in FIGS. 3–5, provision is also made for moving the coils 17 selectively toward and away from the shanks 15 to control the area of the thread to which heat is applied. Thus, the lower end of the post 16a is connected to a frame support member 16c which extends across a longitudinal slot 16d at the top of a tubular member 16e. A bolt 16f extends downwardly through the member 16c into threaded engagement with a rod 16g which is supported for axial sliding movements within the tubular member 16e. The bolt 16f may be loosened manually to permit sliding movement of the bolt and rod to enable movement of the support member 16c, post 16a and coils 17 as a unit toward or away from the fastener 10. Tightening of the bolt 16f clampingly operates to secure the parts in the adjusted position.

In the illustrated embodiment, after the fasteners 10 have been heated, they are transported to a position for the application of the locking compound. Various types of chemical locking materials are customarily used, which include micro-encapsulated epoxy, micro-encapsulated anaerobic adhesive, resinous locking compounds or any other suitable materials which are capable of application by pumping or spraying operations.

A suitable compound supply pump (not shown) may comprise an air motor driven pump having a variable speed control which will permit the flow of compound through a nozzle 21 to be regulated to a small stream. As an example, for micro-encapsulated epoxy, the compound may be pumped by means of a Graymills Model H10-4-GAM-RS type pump. For other types of compounds, such as polyvinyl resin with a methyl ethyl ketone or toluene carrier, the pump may be smaller, and smaller lines may be used with two nozzles spaced 180° apart to insure complete coating.

The use of a pump is of advantage in that it eliminates the conventional reservoir, from which the compound flows by gravity. Other advantages are that there is no loss of solvent such as occurs within a reservoir, no chance of reservoir overflow and no adjustment of the reservoir is necessary.

In order to prevent the relatively small nozzle 21 (such as ⅛" O.D.) from clogging, a mechanical vibrator 22 of the small air ball type or other suitable vibrator means is attached to a hard rubber mount 23 to impart continuous vibration to the nozzle 21 and keep the compound agitated and minimize clogging within the nozzle 21, as shown in FIG. 6.

The nozzle 21 is connected to the pump through a supply hose 21a, and a funnel 21b is disposed beneath the nozzle 21 to recover the compound which does not adhere to the fasteners and return it to the pump for reuse.

The mount 23 is attached to a support member 23a, which is mounted for sliding movement along an upstanding post 23b. A manually operable member 23c releasably holds the support member 23a in vertically adjusted position on the post 23b, and permits adjustment of the nozzle 21 to vary the distance of the nozzle with respect to the shank 15. In this manner, the axial area of the threads that will be covered by the compound can be regulated. Thus, if the nozzle 21 is moved closer to the shank 15 the compound will cover a greater axial area, and if moved away the compound will cover a lesser axial area. At its lower end, the post 23b is supported in a manner, similar to that previously described for the post 16a, which permits adjustably varying the position of the nozzle 21 in a direction axially of the shank 15. Thus, the placement of the compound on the shank may be regulated to position the area closer or farther away from an end of the fastener that is being treated.

Figure 8:
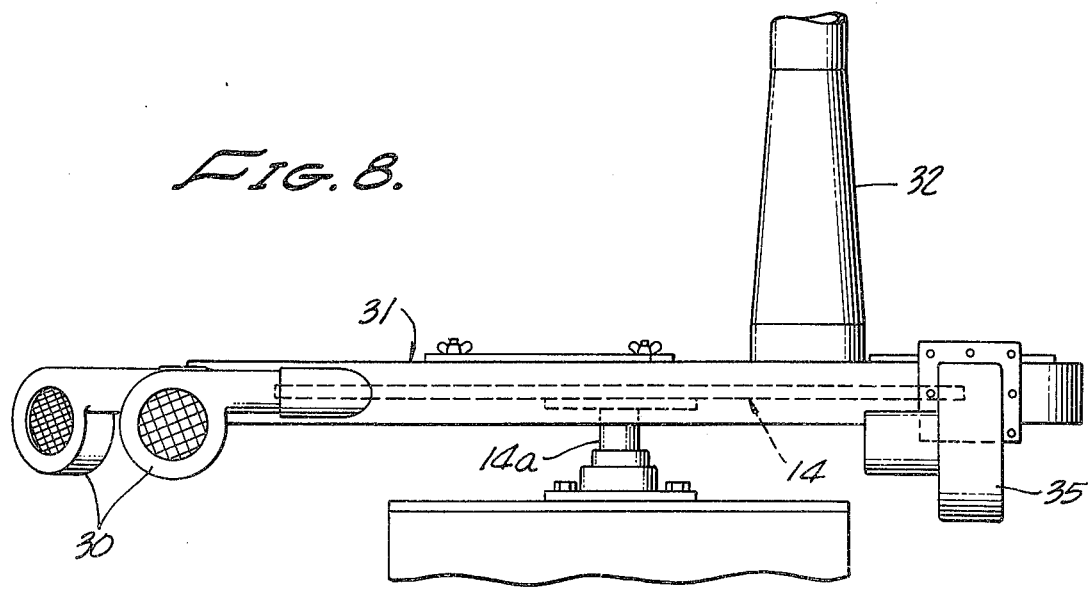
FIG. 8 is an enlarged elevational view as seen from line 8—8 of FIG. 1, showing the heated air chamber assembly.

After the locking compound has been applied to the shanks 15, heat is applied to continue and accelerate driving off the solvent carrier, such as toluene. Hot air at a temperature of approximately 350° F., supplied at the rate of approximately 40 cfm has been found in practice to provide enough air and heat to drive off a large percentage of the remaining solvent. The heated air is illustrated in FIGS. 1 and 8 as being supplied by a pair of blowers 30 having outlet nozzles connected to discharge into an enclosing housing structure 31 extending along a portion of the periphery of the transporting wheel 14 for the passage of the fasteners 10 with the applied locking compound thereon. The inner side of the housing structure has a pair of sealing strips 31a in sealing engagement with upper and lower surfaces of the transporting wheel 14, as shown in FIG. 9. The removed solvent is expelled from the housing structure 31 through an exhaust duct 32 in the top of the housing structure 31.

The next operation is to cool the fasteners to prevent their sticking together after being removed from the transport wheel 14. It is desirable that the fasteners 10 be cooled to a temperature below 100° F., even if the solvent carrier is completely removed. The cooling operation is preferably accomplished in two steps. First, a blower 35 having a capacity of approximately 100 cfm, as illustrated in FIGS. 1, 8 and 10, is connected to supply ambient temperature air to a portion of the housing structure 31 which provides a cooling chamber 36 following the exhaust duct 32 in the path of movement of the fasteners 10 by the transport wheel 14. This cooling step initiates the cooling operation and also helps to blow away any remaining fumes from the evaporating solvent.

Second, as illustrated in FIGS. 1 and 10, a plurality of spray nozzles 37 are mounted in the top of the housing structure 31 to introduce a spray mist of a water soluble oil mixture, from a supply reservoir 37a, into a following portion of the chamber 36. The mist as thus generated effectively cools the fasteners 10 below the 100° F. temperature, as required. The small residue of soluble oil which remains on the fasteners 10 tends to keep them from adhering to each other prior to the hardening of the compound.

As shown in FIGS. 1, 10 and 11, a pick-off wheel 40 is rotatably mounted adjacent the exit end of the housing structure 31 to remove the treated fasteners from the transporting wheel 14. The pick-off wheel 40 is made of non-magnetic stainless steel or other suitable material, and is peripherally serrated to form a plurality of circumferentially extending adjacent arcuate pockets 41 which are dimensioned to receive the shanks 15 of the fasteners 10 therein. The pick-off wheel 40 is vertically positioned and mounts on the side thereof next to the transporting wheel 14 a concentric steel ring 42, which is engaged and magnetically driven in response to the movement of the magnetized layers 14d and 14e of the wheel 14.

The magnetic engagement between the pick-off wheel 40 and the transporting wheel 14 causes the pick-off wheel 40 to rotate in the proper direction so that its pockets 41 engage the shanks 15 of the finished fasteners 10 in a manner to disengage and separate their heads 13 from engagement with the magnetic layers of the wheel 14. The disengaged fasteners 10 then drop by gravity into a receiver 43, such as a tray, bin or other means.

There have been shown and described herein for purposes of illustration only fasteners in the form of beaded bolts. It should be understood, however, that the apparatus and method of the present invention may also be used for applying locking compound to a variety of different types of fasteners including, but not limited to other forms of bolts, various types of screws, and other threaded fastening members either with or without appropriate modification to accommodate the particular part.

What is claimed is:

1. Apparatus for successively applying a liquefied locking compound to the threaded portions of fasteners, which includes:
   a movable conveyor comprising a wheel rotatable about a vertical axis and having a magnetized periphery formed by spaced apart circumferentially extending continuous annular layers of permanently magnetized material;
   means for successively delivering fasteners to a pick-up position adjacent said conveyor;
   means for directing an end of the delivered fasteners to the periphery of said conveyor for magnetically holding said end of said fasteners thereto in bridging relation to said layers and with their thread axes in corresponding horizontally oriented positions for movement along a horizontal curved path;
   means adjacent said path for successively applying a fluent liquefied locking compound at the tops of the threaded portions of the horizontally extending fasteners; and
   means for thereafter separating the attached fasteners from said conveyor.

2. Apparatus according to claim 1, in which said means for applying the locking compound comprises a nozzle having connection with a pressurized source of said fluent liquefied locking compound, said nozzle being positioned to discharge the locking compound onto the threads at a position such that the compound will flow downwardly around the threads in a direction transversely to the thread axis.

3. Apparatus according to claim 2, in which the pressurized source of fluent compound comprises a pump connected directly to said nozzle.

4. Apparatus according to claim 1, which includes a nozzle for vertically applying the fluent compound; and means for adjustably varying the vertical spacing of said nozzle with respect to the fasteners to vary the dimension of the applied compound in an axial direction of the fastener.

5. Apparatus according to claim 1, which includes a nozzle for vertically applying the fluent compound; and means for horizontally adjusting said nozzle with respect to the axis of said fasteners to vary the axial position of the applied compound on the threads of the fasteners.

6. Apparatus according to claim 1, which includes means adjacent said wheel periphery for heating the fasteners prior to the application of said locking compound, said heating means comprising inductive heating coils positioned above and below and conformed to the curved path of movement of the fasteners.

7. Apparatus according to claim 6, which includes means supporting said heating coils for horizontal and vertical independent adjustments with respect to said horizontally oriented fasteners on the conveyor.

8. Apparatus for successively applying locking compound to the threaded portions of fasteners, which includes:
a movable conveyor;
means for successively delivering fasteners to a pick-up position adjacent said conveyor;
means for attaching the delivered fasteners to said conveyor with their thread axes in corresponding horizontally oriented positions for movement along a predetermined path;
means adjacent said path for successively applying a fluent liquefied locking compound to threaded portions of the horizontally extending fasteners;
means for thereafter separating the attached fasteners from said conveyor;
said means for applying the locking compound comprising a nozzle having connection with a pressurized source of said fluent liquefied locking compound, said nozzle being positioned to discharge the locking compound onto the threads at a position such that the compound will flow in a direction transversely to the thread axis;
said nozzle being mounted on a resilient support, and a connected vibrator imparting continuous vibration to said nozzle to prevent clogging thereof.

9. Apparatus for successively applying locking compound to the threaded portions of fasteners, which includes:
a movable conveyor;
means for successively delivering fasteners to a pick-up position adjacent said conveyor;
means for attaching the delivered fasteners to said conveyor with their thread axes in corresponding horizontally oriented positions for movement along a predetermined path;
means adjacent said path for successively applying a fluent liquefied locking compound to threaded portions of the horizontally extending fasteners;
means for thereafter separating the attached fasteners from said conveyor;
said conveyor comprising a rotatably mounted wheel having a vertical axis of rotation; and the fasteners being attached at one end to the wheel periphery; and
said fastener separating means comprising a generally vertically disposed pick-off wheel rotated by magnetic means at the periphery of said wheel, said pick-off wheel having peripheral means for engaging and separating said fasteners from said wheel.

10. Apparatus for successively applying locking compound to the threaded portions of fasteners, which includes:
a movable conveyor comprising a rotatably mounted wheel having a vertical axis of rotation;
means for successively delivering fasteners to a pick-up position adjacent said conveyor;
means for attaching the delivered fasteners at one end to said conveyor with their thread axes in corresponding horizontally oriented positions for movement along a predetermined path;
means for heating the fasteners;
means adjacent said path for successively applying a fluent liquefied locking compound to threaded portions of the horizontally extending heated fasteners;
an elongate enclosing housing extending along a portion of the wheel periphery for the passage of said fasteners after the application of said locking compound, and which includes means in an entrance end portion of the housing for directing an air blast into the housing to flow over said fasteners to drive off solvents carried by said locking compound, and an exhaust duct intermediate the housing ends for expelling the solvents; and
means for thereafter separating the attached fasteners from said conveyor.

11. Apparatus according to claim 10, which further includes means connected with said housing between said exhaust duct and an exit end of said housing structure for cooling said fasteners after said fasteners have been subjected to said air blast.

12. Apparatus for successively applying locking compound to the threaded portions of fasteners, which includes:
a movable conveyor comprising a wheel rotatable about a vertical axis and having a magnetized periphery;
means for successively delivering fasteners to a pick-up position adjacent said conveyor;
means for directing an end of the delivered fasteners to the periphery of said conveyor for magnetically holding said end of said fasteners thereto with their thread axes in corresponding horizontally oriented positions for movement along a horizontal path;
means adjacent said path for successively applying a fluent liquefied locking compound at the tops of the threaded portions of the horizontally extending fasteners;
means adjacent said wheel periphery for heating the fasteners;
an elongate enclosing housing extending along a portion of the wheel periphery for the passage of said fasteners after the application of said locking compound, and in which the heating means includes means in an entrance end portion of the housing for directing heated air into the housing to flow over said fasteners to drive off solvents carried by said locking compound, and an exhaust duct intermediate the housing ends for expelling the solvents;
means connected with said housing between said exhaust duct and an exit end of said housing structure for cooling said fasteners after said fasteners have been subjected to said heated air including means for initially directing air over said fasteners at substantially an ambient temperature, and means at the exit end for thereafter directing a cooling mist over said fasteners; and
means for thereafter separating the attached fasteners from said conveyor.

13. Apparatus according to claim 12, in which said mist directing means includes a spray nozzle, and said mist comprises a soluble oil to prevent said fasteners from sticking together prior to hardening of said locking compound.

* * * * *

UNITED STATES PATENT AND TRADEMARK OFFICE
CERTIFICATE OF CORRECTION

PATENT NO. : 4,155,327
DATED : May 22, 1979
INVENTOR(S) : SCOTT R. ALEXANDER AND DARREL L. BURKE

It is certified that error appears in the above-identified patent and that said Letters Patent are hereby corrected as shown below:

Column 1, line 41, "50" should read --having--.

Signed and Sealed this

Second Day of October 1979

[SEAL]

Attest:

RUTH C. MASON
Attesting Officer

LUTRELLE F. PARKER
Acting Commissioner of Patents and Trademarks